US006779316B2

(12) United States Patent
Carroll

(10) Patent No.: US 6,779,316 B2
(45) Date of Patent: Aug. 24, 2004

(54) SAFETY ANCHOR

(76) Inventor: Kenneth Carroll, 12 Horicon Ave., Oceanport, NJ (US) 07757

(*) Notice: Subject to any disclaimer, the term of this patent is extended or adjusted under 35 U.S.C. 154(b) by 58 days.

(21) Appl. No.: 09/773,352

(22) Filed: Jan. 31, 2001

(65) Prior Publication Data
US 2002/0100244 A1 Aug. 1, 2002

(51) Int. Cl.[7] .............................. F16B 21/02; E04B 1/41
(52) U.S. Cl. ...................... 52/698; 52/127.5; 52/700; 52/164; 411/342; 411/340
(58) Field of Search ................................ 411/342, 341, 411/340, 345; 182/36, 3, 45; 52/698, 127.5, 164, 160, 699, 700

(56) References Cited

U.S. PATENT DOCUMENTS

| 450,127 | A | * | 4/1891 | Wrigley | 411/340 |
|---|---|---|---|---|---|
| 945,269 | A | * | 1/1910 | Fuchs | 52/160 |
| 1,169,635 | A | * | 1/1916 | Grimes | 411/340 |
| 1,193,725 | A | * | 8/1916 | Smith | 52/164 |
| 1,598,407 | A | * | 8/1926 | Tomkinson | 52/164 |
| 2,058,751 | A | * | 10/1936 | Woolfrey | 52/164 |
| 2,243,886 | A | * | 6/1941 | Scott | 52/164 |
| 2,347,581 | A | * | 1/1944 | Turner | 411/342 |
| 2,428,381 | A | * | 10/1947 | Parry | 411/342 |
| 2,567,372 | A | * | 9/1951 | Gelpcke | 411/342 |
| 2,911,859 | A | * | 11/1959 | Longley et al. | 411/342 |
| 3,017,000 | A | * | 1/1962 | Hynds | 52/160 |
| 4,245,545 | A | * | 1/1981 | Freeman | 411/342 |
| 4,286,497 | A | * | 9/1981 | Shamah | 411/342 |
| 4,298,298 | A | * | 11/1981 | Pontone | 411/342 |
| 4,668,144 | A | * | 5/1987 | Giannuzzi | 411/342 |
| 4,997,327 | A | * | 3/1991 | Cira | 411/340 |
| 5,054,576 | A | | 10/1991 | Glynn | 182/3 |
| 5,137,112 | A | | 8/1992 | Nichols | 182/3 |
| 5,143,171 | A | | 9/1992 | Glynn et al. | |
| 5,267,423 | A | | 12/1993 | Giannuzzi | |
| 5,346,036 | A | | 9/1994 | Arisman et al. | |
| 5,361,558 | A | | 11/1994 | Thornton et al. | |
| RE35,358 | E | * | 10/1996 | Belser | 411/342 |
| 5,664,391 | A | | 9/1997 | Bartholomew | |
| 5,687,535 | A | | 11/1997 | Rohlf | |
| 5,699,875 | A | | 12/1997 | Dugan | |
| 5,730,407 | A | | 3/1998 | Ostrobrod | |
| 5,829,203 | A | | 11/1998 | Ealer, Sr. | |
| 5,845,452 | A | | 12/1998 | Pantano | |
| 5,850,889 | A | | 12/1998 | Rexroad et al. | |
| 6,318,941 | B1 | * | 11/2001 | Guenther | 411/342 |

FOREIGN PATENT DOCUMENTS

| FR | 1028629 | * | 2/1953 | 411/342 |
|---|---|---|---|---|
| GB | 591949 | * | 9/1947 | 411/342 |
| GB | 2011148 | * | 1/1979 | 411/342 |

* cited by examiner

Primary Examiner—Phi Dieu Tran A
(74) Attorney, Agent, or Firm—Lerner, David, Littenberg, Krumholz & Mentlik, LLP

(57) ABSTRACT

The present invention generally provides an anchor for providing an attachment point on a surface. In one embodiment, the anchor includes a center shaft having a first member and a second member pivotally coupled thereto. The center shaft has an attachment end and a piercing end. The piecing end is driven through the surface allowing the first and second members to pass therethrough. Once through the surface, the first and second members rotate away from the center shaft to an open position, thus preventing the anchor from disengaging the roof. A collar may be slidably disposed on the center shaft. The collar may be slid against the surface to lock the members in the open position.

17 Claims, 8 Drawing Sheets

SAFETY ANCHOR

BACKGROUND OF THE INVENTION

1. Field of the Invention

The present invention relates to an anchor for providing an attachment point on a structure such as a roof and the like.

2. Background of the Related Art

Fall restraints or safety anchors are commonly used by roofers and other construction personnel to prevent serious injury when working on roofs and other elevated areas. Typical fall restraints generally include an eye positioned on the roof's exterior and an attachment means to affix the eye the roof. Often, the attachment means is difficult or time consuming to deploy. For example, some restraints require access to the interior of the structure to fasten the restrain. See U.S. Pat. No. 5,730,407, issued Mar. 24, 1998 to Ostrobrod and U.S. Pat. No. 5,687,535, issued Nov. 18, 1997 to Rohlf. Others require drilling a hole through the roof proximate access to a structural member such as a rafter. See U.S. Pat. No. 5,850,889, issued Dec. 22, 1998 to Rexroad et al. Still others require locating the rafter from the exterior of the roof to enable the attachment means to be coupled thereto. See U.S. Pat. No. 5,137,112, issued Aug. 11, 1992 to Nichols. Generally, these devices are difficult to deploy solely from the exterior of the roof. Moreover, the time required to properly affix most fall restraints to the roof may their use impractical during emergency situations.

For example, a firefighter stationed on a roof while fighting a fire would benefit from the use of a fall restraint. The pitch of the roof makes it difficult to maintain sure footing on the roof, particularly when handling equipment and hoses. Moreover, water and foam used to extinguish fires often makes the roof slippery, especially when temperatures are below freezing. The difficult working environment makes use of most existing fall restrains difficult.

Thus, there is a need for an improved anchor.

SUMMARY OF THE INVENTION

The present invention generally provides an anchor for providing an attachment point on a surface. In one embodiment, the anchor includes a center shaft having a first member and a second member pivotally coupled thereto. The center shaft has an attachment end and a piercing end. The piecing end is driven through the surface allowing the first and second members to pass therethrough. Once through the surface, the first and second members rotate away from the center shaft to an open position, thus preventing the anchor from disengaging the surface.

In another embodiment, the anchor additionally comprises a collar slidably disposed on the center shaft. The collar may be slid against the surface to lock the members in the open position.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
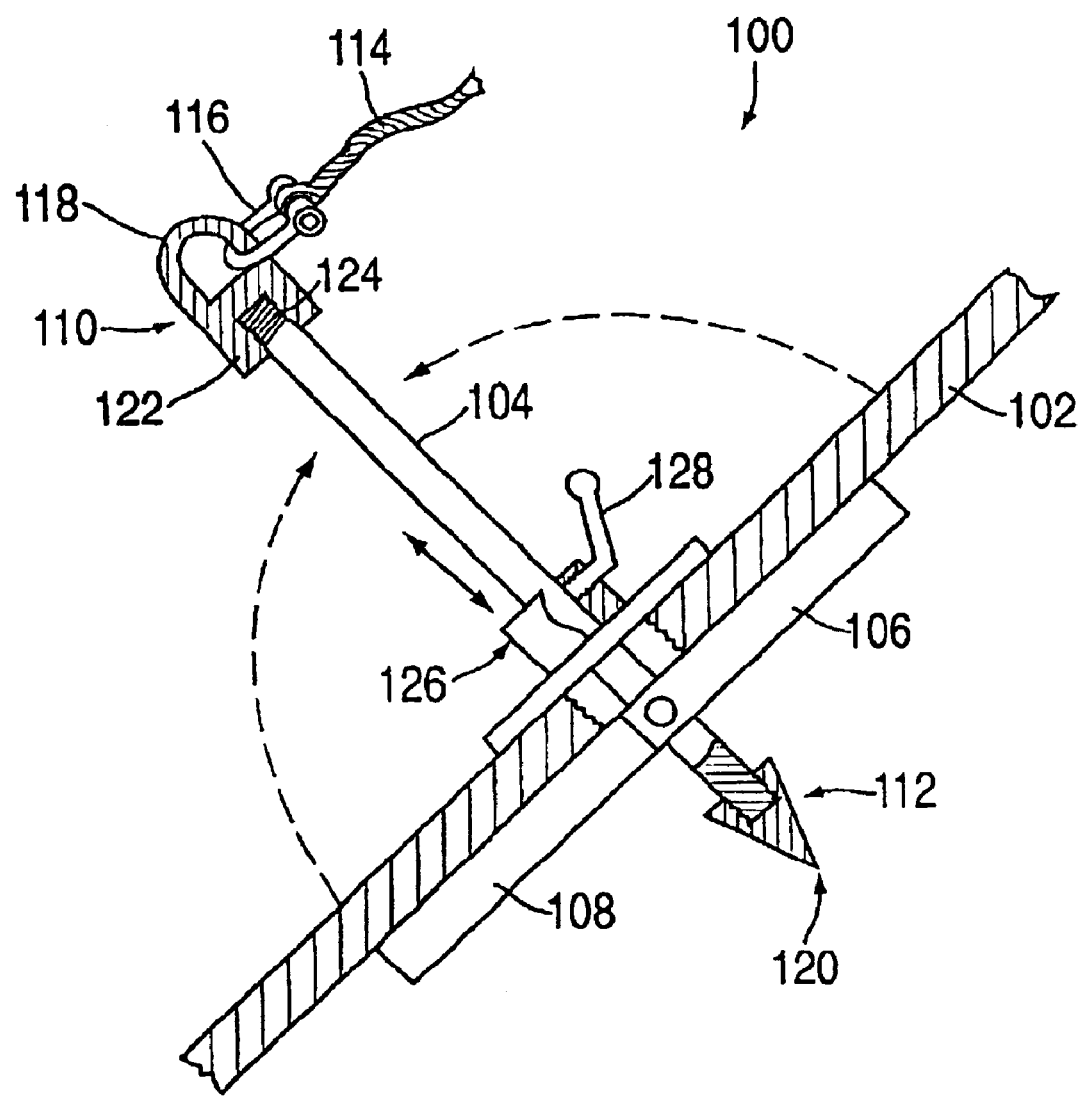
FIG. 1 is a schematic of one embodiment of a safety anchor of the invention.

FIG. 1 depicts one embodiment of a safety anchor 100. The safety anchor 100 generally is used to provide an anchor point that may be rapidly deployed through a roof 102 or other structure. Although the illustrative embodiment of the safety anchor 100 is described as providing an anchor point for a fall restraint disposed on a pitched roof 102, the anchor 100 provides utility where ever an attachment point 120 is desired in a piercable surface.

The safety anchor 100 generally includes a center shaft 104 having a first member 106 and a second member 108 pivotally coupled thereto. The first and the second members 108 generally are driven through the roof 102 in a "folded" position adjacent the center shaft 104. Upon clearing the roof 102, the first and the second members 106, 108 rotate to an "open" position that Is typically substantially perpendicular to the center shaft 104 as shown in FIG. 1. In the open position, the members 106, 108 impinge against the interior side of the roof 102 and prevent the anchor 100 from being pulled back out from the roof 102.

To secure the first and the second members 106, 108 in the open position against the roof 102, a collar 126, slidably disposed on the shaft 104, is moved against the exterior portion of the roof 102, thus sandwiching the roof 102 between the members 106, 108 and the collar 126. The collar 126 generally includes a locking mechanism 128 to retain the collar 126 against the roof 102. The locking mechanism 128 may comprise a shaft clamp, a tee or thumb screw, a set screw, a collet or the like.

The center shaft 104 generally has a round cross-section but may alternatively be square, triangular, keptangular, hexagonal and the like is typically fabricated from metal, polymer or composite material of comparable strength. In one embodiment, the shaft 104 is configured to withstand shear and tensile loads in excess of 5,000 pounds. The center shaft 104 has an attachment end 110 and a piercing end 112. The attachment end 110 generally allows a safety line 114 to be secured thereto directly or by use of shackle 116, a carbine clip, eyebolt or similar device. In one embodiment, the attachment end 110 comprises a ring 118. Optionally, the ring 118 may be removable from the center shaft 104, for example, by a threaded portion 122 having a mating thread 124 disposed on the shaft 104, or alternatively, by bolting, clevis pin and the like. Generally, the ring 118 is configured to withstand a blow from a sledgehammer, ax or similar object used to drive the piercing end 112 through the roof 102.

The piercing end 112 generally includes a knife-edge or point 120 to facilitate puncture of the roof 102. The piercing end 112 may be a contiguous part of the center shaft 104 or may be a separate member. In one embodiment, the piercing end 112 is removably coupled to the shaft 104, for example, by a threaded portion 122 having a mating thread 124 disposed on the shaft 104. Alternatively, the piercing end 112 may be secured to shaft by bolting, clevis pin, welding or the like. A removable piercing end 112 allows the piercing end 112 to be replaced in the event the point 120 is damaged.

Figure 2:
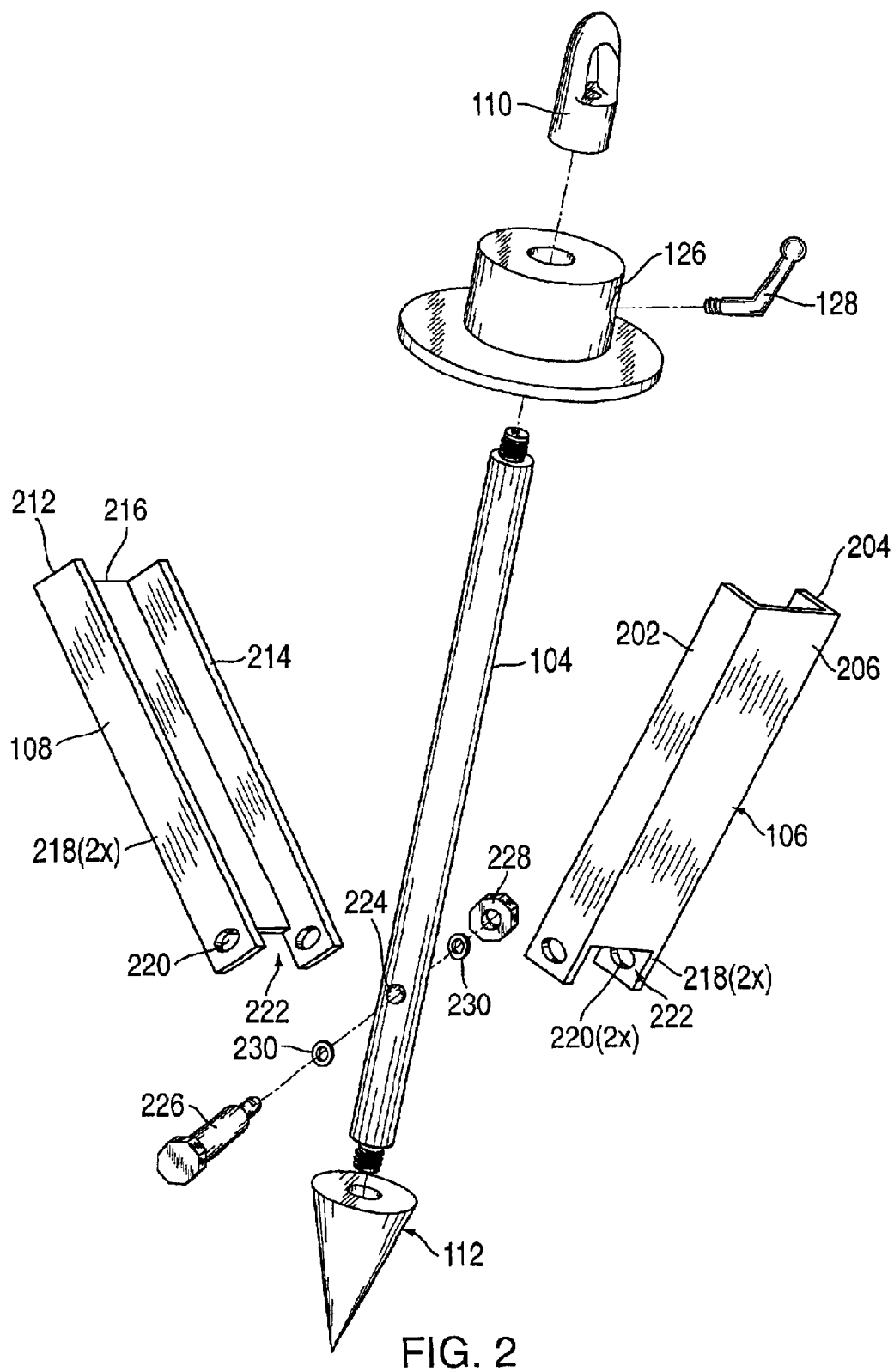
FIG. 2 is an exploded view of one embodiment of a safety anchor.
Figure 3:
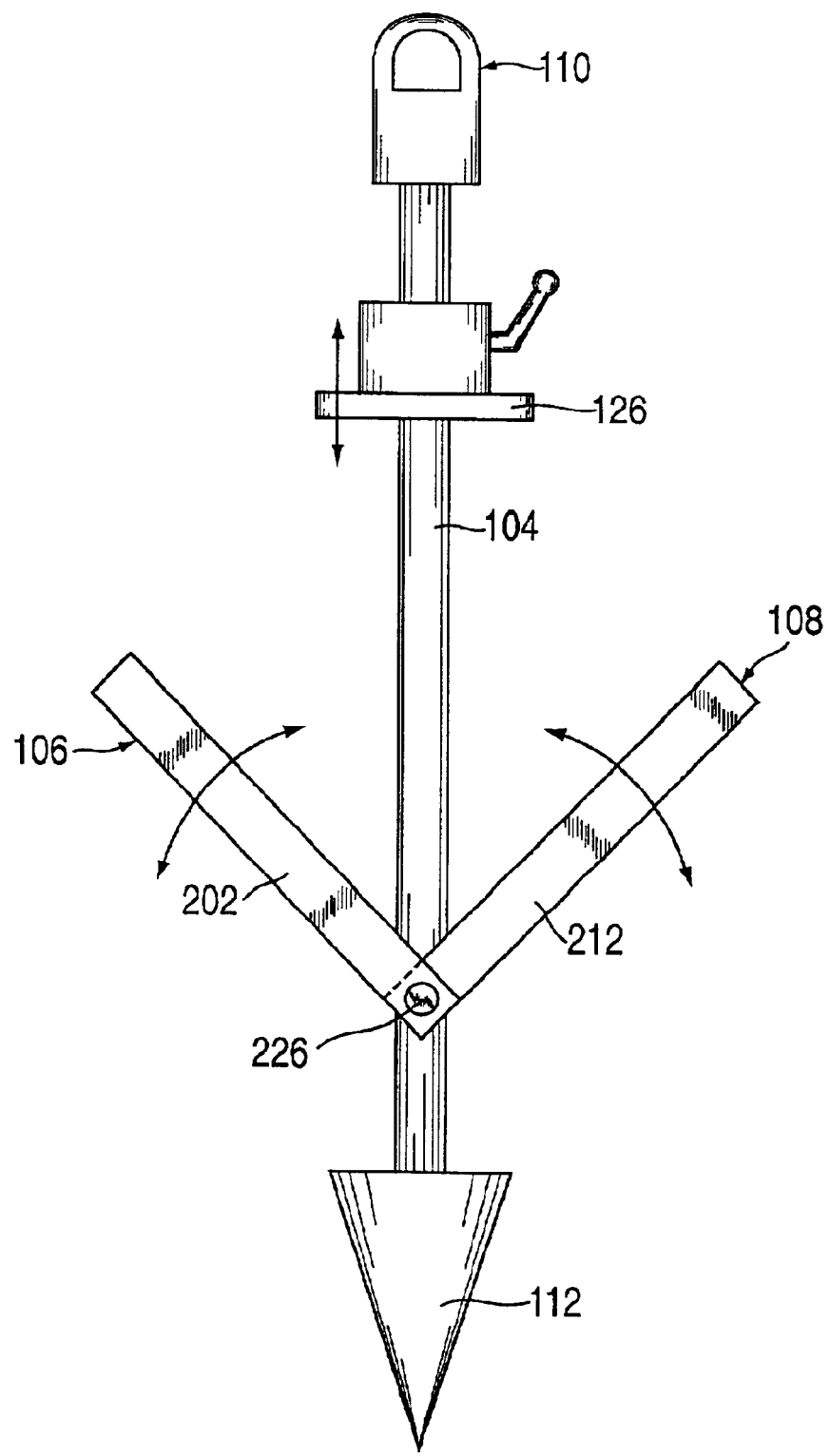
FIG. 3 is a side view of the safety anchor of FIG. 2.

FIGS. 2 and 3 depict exploded and side views of one embodiment of the first and the second members 106, 108 coupled to the center shaft 104. The first member 106 and the second member 108 are generally coupled to the center shaft 104 near the piercing end 112. The members 106, 108 are generally fabricated from a metallic, polymeric or composite material. The members 106, 108 typically have a "C" or "U" cross-section, each having a first side 202, 212, a second side 204, 214 connected by a center section 206, 216, respectively.

Figure 4:
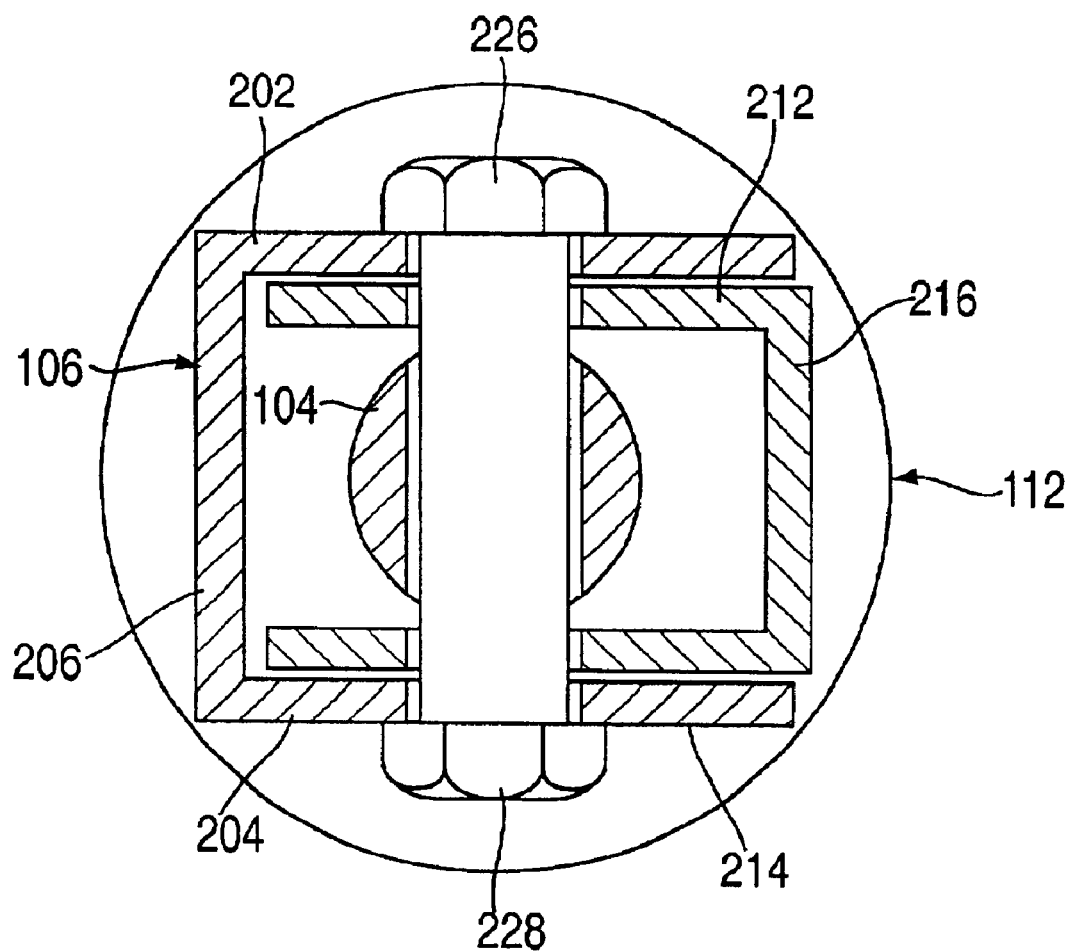
FIG. 4 is a sectional view of safety anchor of FIG. 2.

The center section 206 of the first member 106 is generally wide enough to allow the first and the second sides 202, 204 of the first member 106 to straddle the shaft 104 when the first member 106 is in the closed position. The second member 108 is disposed on the side of the shaft 104 opposite the first member 106. The center section 216 of the second member 108 is configured to allow the sides 212, 214 of the second member 108 to overlay the sides 202, 204 of the first member 106 when the members 106, 108 are in the closed position (See FIG. 4).

Generally each member 106, 108 has a first end 208 and a second end 210. The first side 202 and second side 204 of each member 106, 108 have a mounting tab 218 extending therefrom. Each mounting tab 218 includes a mounting hole 220 is disposed through tab 218 co-axial to the mounting hole 220 disposed in the tab 218 on the opposite side of the member. A gap 222 is defined between the tabs 218 and center section 206 that allows each member 106, 108 to rotate fully between the closed and open position without the center section 206 binding on the shaft 104. In the open position, the center sections 206, 216 abut the shaft 104, thus preventing the members 106, 108 from rotation substantially beyond the open position. The mounting holes 220 in the members 106, 108 are aligned with an aperture 224 disposed in the shaft 104. A bolt 226 is passed through the mounting holes 220 and the aperture 224 disposed in the shaft 104 to couple the members 106, 108 to the shaft 104. The bolt 226 is generally secured by a lock nut 228. Other means for securing 118 the members 106, 108 to the shaft 104 may be utilized, for example, a clevis pin, a dowel pin with retaining rings, a rivet and the like. In one embodiment, the piercing end 112 is configured to have a diameter larger than a projected area of the bolt 226 and nut 228 such that the bolt 226 is protected from shearing during penetration of the roof 102.

Optionally, a torsion spring 230 may be disposed on the bolt 226 to bias the members 106, 108 towards the open position. The spring 230 allows the members 106, 108 to rotate to the closed position when passing through the roof 102 and returns the members 106, 108 to the open position once the members have penetrated the roof. Having the members 106, 108 biased to the open position prevents the anchor 100 from inadvertently backing out from the roof 102.

Figure 5:
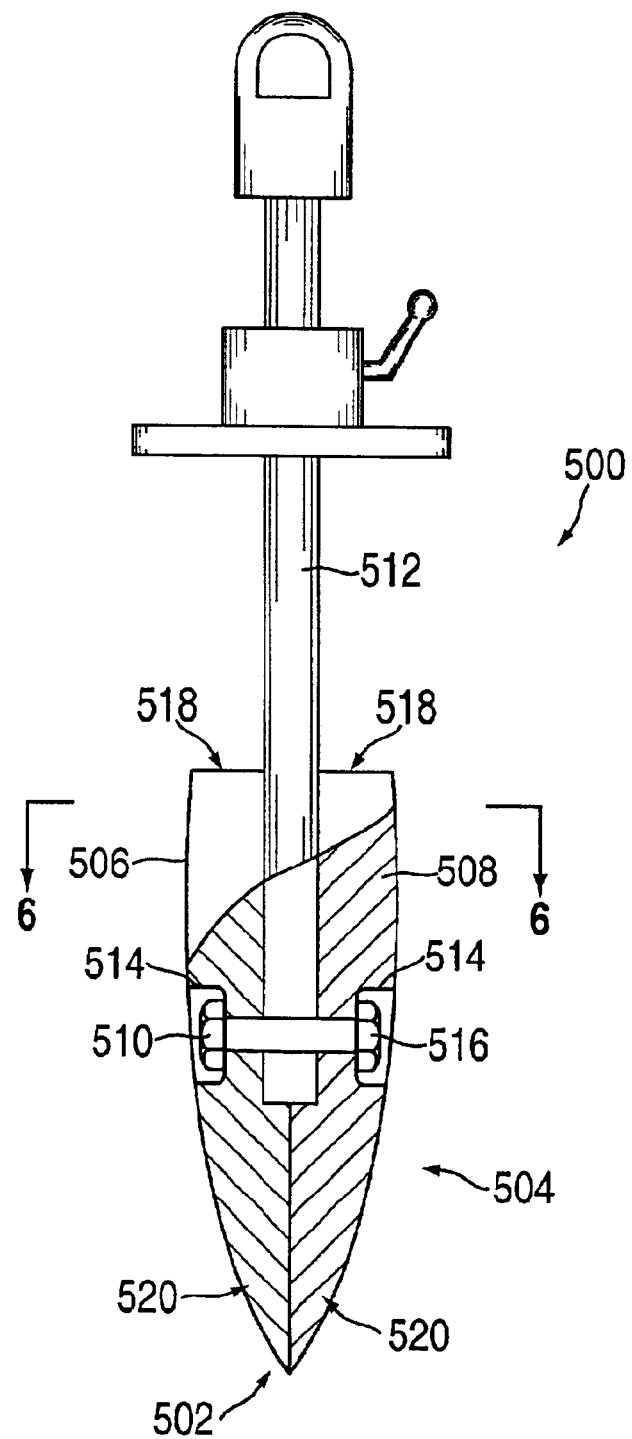
FIG. 5 is schematic of another embodiment of a safety anchor.

FIG. 5 depicts another embodiment of a safety anchor 500. The anchor 500 is substantially similar to the anchor 100 except that a point 502 of a piercing end 504 is integral to a first rotating member 506 and a second rotating member 508. Generally, the members 506, 508 are configured substantially in mirror images of each other. The members 506, 508 have a bolt 510 passing therethrough that pivotally couples the members 506, 508 to a center shaft 512. The members 506, 508 each have a counter bore 514 formed therein that allows the head of the bolt 510 and a nut 516 fastened thereto to be recessed from the outer surface of the members 506, 508.

Each member 506, 508 generally has a pointed end 520 that forms a portion of the point 502 when the members 506, 508 are in the closed position while a second end 518 of the members 506, 508 substantially circumscribe the shaft 512. When the members 506, 508 are rotated into the open position, the pointed end 514 of one member contacts the second send 518 of the opposing member, thus supporting the members 506, 508 in a position substantially perpendicular to the axis of the shaft 512.

Figure 6:
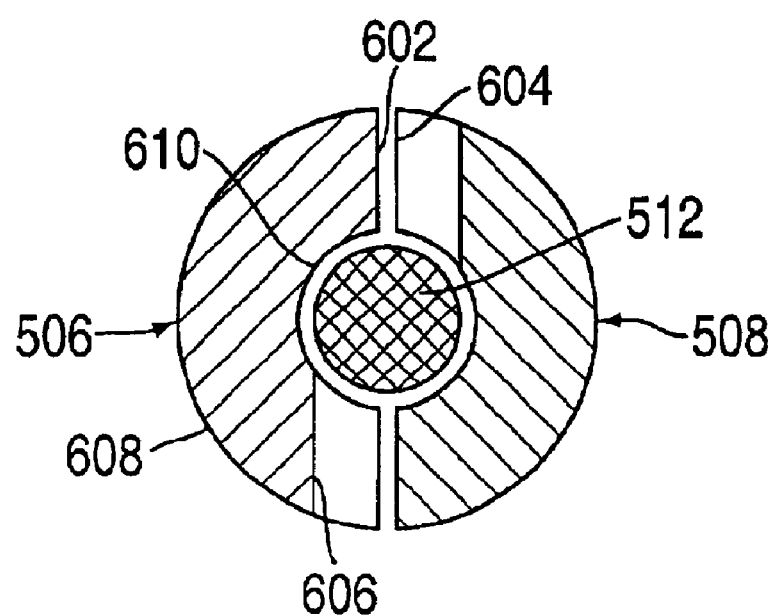
FIG. 6 is a sectional view of the safety anchor of FIG. 4 taken along section lines 4—4.
Figure 7A:
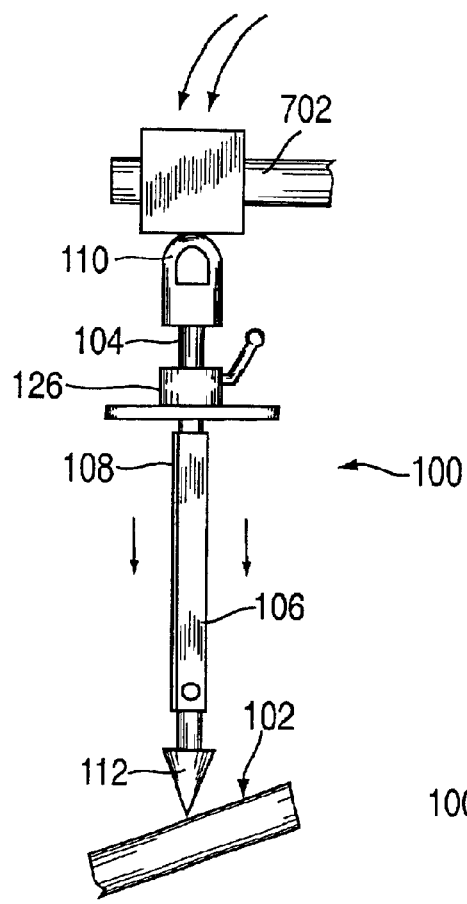
FIGS. 7A–7D depict a mode of operation for the safety anchor of FIG. 2.
Figure 7B:
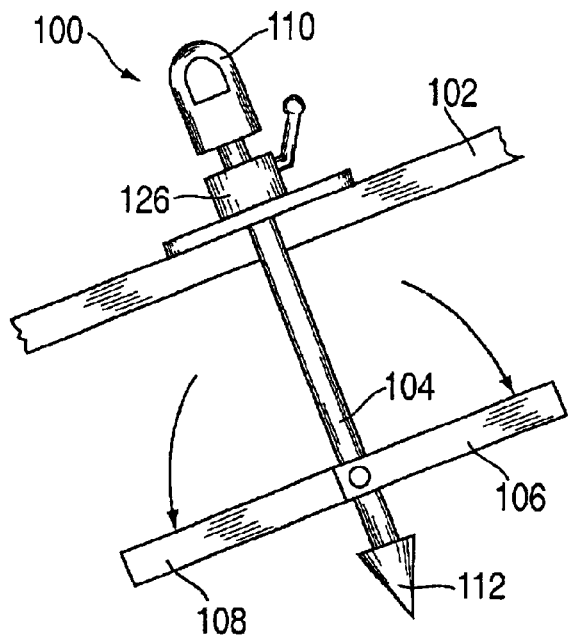
Figure 7C:
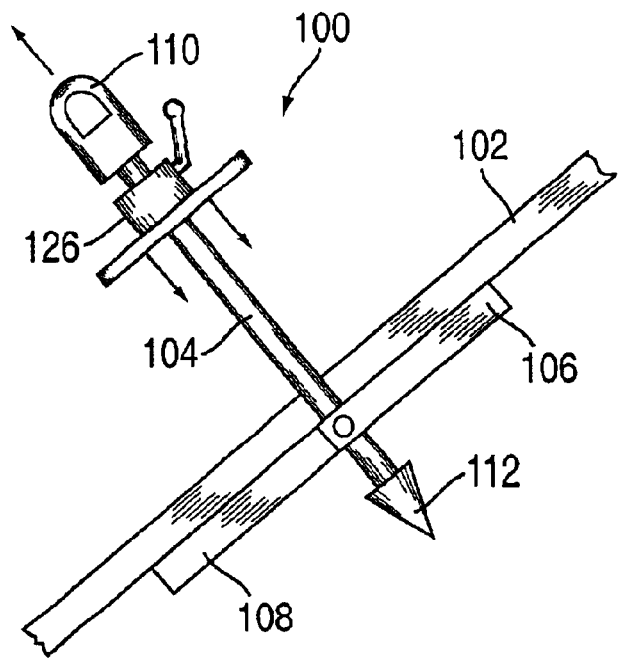
Figure 7D:
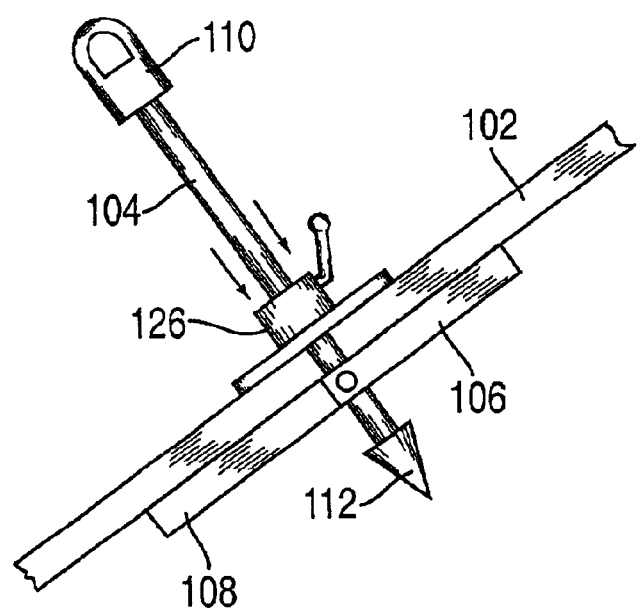

FIG. 6 depicts a sectional view of one embodiment of the second end 518 of the members 506, 508. Generally, the members 506, 508 have a semi-tubular cross-section. The member 506 has a first side 602 generally orientated substantially perpendicular to the axis of rotation of the first member 506 and opposes, a first side 604 of the second member 508. A second side 606 is disposed on the opposite side of the shaft 512. The sides 604 and 606 are coupled by an outer arc 608 and an inner arc 610. The second side 606 is configured to extend substantially tangential from the inner arc 608 so that the second end 518 of the member 506 clears the shaft 512 as the member 506 rotates. The second member 408 is similarly configured.

An exemplary description of operation of the anchor 100 is described with reference to FIGS. 7A–7D. Other modes of operation may be performed, for example, providing an anchor point in a wall and are contemplated by the inventor. In the exemplary mode of operation, the anchor 100 is positioned with the piercing end 112 in contact with the roof 102. The attachment end 112 is stuck with an object such as an axe 702 to drive the piercing end 112, the first member 106 and the second member 108 through the roof 102.

Once the second end 210 of the members 106, 108 have passed through the roof 102, the members 106, 108 then rotate to the open position, preventing the anchor 100 from becoming disengaged from the roof 102. The members 106, 108 are pulled against the motor and the collar 126 is then slid against the roof 102. The locking mechanism 128 is engaged to secure the collar's position against the roof 102, thus securing the anchor 100 to the roof.

While foregoing is directed to the preferred embodiment of the present invention, other and further embodiments of the invention may be devised without departing from the basic scope thereof, and the scope thereof is determined by the claims that follow.

What is claimed is:

1. A safety anchor adapted for providing an attachment point to a wall of a building and attaching a safety tether thereto to support the weight of an adult human, comprising:
   (a) a center shaft comprising a tether attachment end and a wall piercing end,
   said wall piercing end having an upper portion having a first diameter and a lower portion inwardly tapering to a sharp piercing point adapted to facilitate the piercing of said wall piercing end through the exterior and interior surfaces of the wall when said anchor is driven into the wall,
   said tether attachment end including an aperture adapted for coupling to the tether to provide a fall restraint to an adult human coupled to the tether,
   said center shaft having a tensile strength adapted to support at least the full weight of an adult human;
   (b) first and second members pivotally coupled to said center shaft between a closed position against said center shaft and an open position extending away from said center shaft, said first diameter of said wall piercing end being equal to or greater than the distance between said first and second members when in said closed position;

(c) a collar movable up and down along said center shaft and having
an upper portion proximate to said attachment end and having a first diameter, and a
lower portion proximate to said piercing end and having a second diameter larger than said first diameter of said upper portion of said collar and said first diameter of said piercing end; and (d) a locking mechanism coupled to said collar for locking said collar to said center shaft and adapted to securely hold said lower portion of said collar against the exterior surface of the wall while securely holding said first and second members against the interior surface of the wall when in said open position and further adapted to thereby sandwich the wall between said lower portion of said collar and said first and second members.

2. The safety anchor of claim 1, wherein said lower portion of said collar comprises a flange extending radially outwardly from said center shaft.

3. The safety anchor of claim 1, wherein said tensile strength of said center shaft is at least 5000 pounds.

4. The safety anchor of claim 1, wherein said locking mechanism comprises one of a clamp, set screw, threaded members or a pin.

5. The safety anchor of claim 1, further comprising a spring that biases at least one of said first and second members away from said center shaft.

6. The safety anchor of claim 1, wherein said aperture is formed by a ring disposed on said attachment end.

7. The safety anchor of claim 1, wherein said first and second members each include ends that meet to form said piercing end when said members are in said closed position.

8. The safety anchor of claim 1, further comprising a pivot member disposed through said center shaft and coupling said first and second members to said center shaft.

9. A safety anchor, in combination with a wall of a building, adapted to provide an attachment point to the wall for attaching a safety tether thereto to support the weight of an adult human, comprising:

(a) a wall of a building having an interior surface and an exterior surface; and (b) a safety anchor comprising
i. a center shaft comprising a tether attachment end and a wall piercing end, said wall piercing end having an upper portion having a first diameter and a lower portion inwardly tapering to a sharp piercing point to facilitate the piercing of said wall piercing end through said exterior and interior surfaces of said wall when said anchor is driven into said wall, said tether attachment end including an aperture adapted for coupling to the tether to provide a fall restraint to a human coupled to the tether, said center shaft having a tensile strength adapted to support at least the full weight of an adult human;

ii. first and second members pivotally coupled to said center shaft between a closed position against said center shaft and an open position extending away from said center shaft, said first diameter of said wall piercing end being equal to or greater than the distance between said first and second members when in said closed position;

iii. a collar movable up and down along said center shaft and having an upper portion proximate to said attachment end and having a first diameter, and a lower portion proximate to said piercing end and having a second diameter larger than said first diameter of said upper portion of said collar and said first diameter of said piercing end; and iv. a locking mechanism coupled to said collar for locking said collar to said center shaft to securely hold said lower portion of said collar against said exterior surface of said wall while securely holding said first and second members against said interior surface of said wall when in said open position to thereby sandwich said wall between said lower portion of said collar and said first and second members.

10. The combination of claim 9, wherein said lower portion of said collar comprises a flange extending radially outwardly from said center shaft.

11. The combination of claim 9, wherein said tensile strength of said center shaft is at least 5000 pounds.

12. The combination of claim 9, wherein said locking mechanism comprises one of a clamp, set screw, threaded members or a pin.

13. The combination of claim 9, further comprising a spring that biases at least one of said first and second members away from said center shaft.

14. The combination of claim 9, wherein said aperture is formed by a ring disposed on said attachment end.

15. The combination of claim 9, wherein said first and second members each include ends that meet to form said piercing end when said members are in said closed position.

16. The combination of claim 9, further comprising a pivot member disposed through said center shaft and coupling said first and second members to said center shaft.

17. The combination of claim 9, wherein said wall comprises a roof of the building.

* * * * *